(12) United States Patent
Stix et al.

(10) Patent No.: US 9,194,443 B2
(45) Date of Patent: Nov. 24, 2015

(54) SYNCHRONISING DEVICE BETWEEN TWO REVOLVING COMPONENTS

(71) Applicant: Miba Sinter Austria GmbH, Laakirchen (AT)

(72) Inventors: Stefan Stix, Bad Wimsbach/Neydharting (AT); Alexander Mueller, Altmuenster (AT)

(73) Assignee: Miba Sinter Austria GmbH, Laakirchen (AT)

( * ) Notice: Subject to any disclaimer, the term of this patent is extended or adjusted under 35 U.S.C. 154(b) by 29 days.

(21) Appl. No.: 14/344,163

(22) PCT Filed: Dec. 5, 2012

(86) PCT No.: PCT/AT2012/050189
§ 371 (c)(1),
(2) Date: Mar. 11, 2014

(87) PCT Pub. No.: WO2013/082641
PCT Pub. Date: Jun. 13, 2013

(65) Prior Publication Data
US 2015/0159705 A1      Jun. 11, 2015

(30) Foreign Application Priority Data
Dec. 9, 2011   (AT) .............................. A 50003/2011

(51) Int. Cl.
*F16D 23/02*    (2006.01)
*F16D 23/06*    (2006.01)

(52) U.S. Cl.
CPC ............... *F16D 23/06* (2013.01); *F16D 23/02* (2013.01); *F16D 2023/0631* (2013.01); *F16D 2023/0637* (2013.01)

(58) Field of Classification Search
None
See application file for complete search history.

(56) References Cited

U.S. PATENT DOCUMENTS 5,927,146 A * 7/1999 Dutson ...................... 192/53.34
8,556,054 B2 * 10/2013 Hiraiwa ..................... 192/53.34
2009/0031837 A1 * 2/2009 Yoshino ......................... 74/339

FOREIGN PATENT DOCUMENTS

DE    17 79 255 U    12/1958
DE    33 10 749 A1   10/1983
(Continued)

OTHER PUBLICATIONS

International Search Report of PCT/AT2012/050189, mailed Apr. 2, 2013.

*Primary Examiner* — Jacob S Scott
(74) *Attorney, Agent, or Firm* — Collard & Roe, P.C.

(57) ABSTRACT

The invention relates to a synchronizing device between two revolving components, comprising a clutch (3) between a hub (4) arranged on a shaft (1) in a rotationally fixed manner and a coupling member (2) that is rotatably mounted in relation to the hub (4), the clutch (3) having a selector sleeve (5) with an internal claw gear (6) which extends along the axial length of the selector sleeve (5) and by means of which claw gear the selector sleeve (5) is mounted in an axially displaceable manner on a claw rim (9) of the hub (4) and can be slid up onto a claw rim (9) of the coupling member (2) for coupling purposes. In order to provide advantageous constructional conditions it is proposed that the hub (4) forms at least one stop (19) for the selector sleeve (5) on the front side facing away from the coupling member (2), the stop (19) protruding radially over the claw rim (7) and the selector sleeve (5) receiving the stop (19) in a frontal stop recess (20).

2 Claims, 2 Drawing Sheets

(56) References Cited

FOREIGN PATENT DOCUMENTS

| | | |
|---|---|---|
| DE | 10 161 596 A1 | 6/2003 |
| EP | 0 463 899 A1 | 1/1992 |
| EP | 2 180 213 A1 | 4/2010 |
| KR | 100887848 B1 | 3/2009 |

* cited by examiner

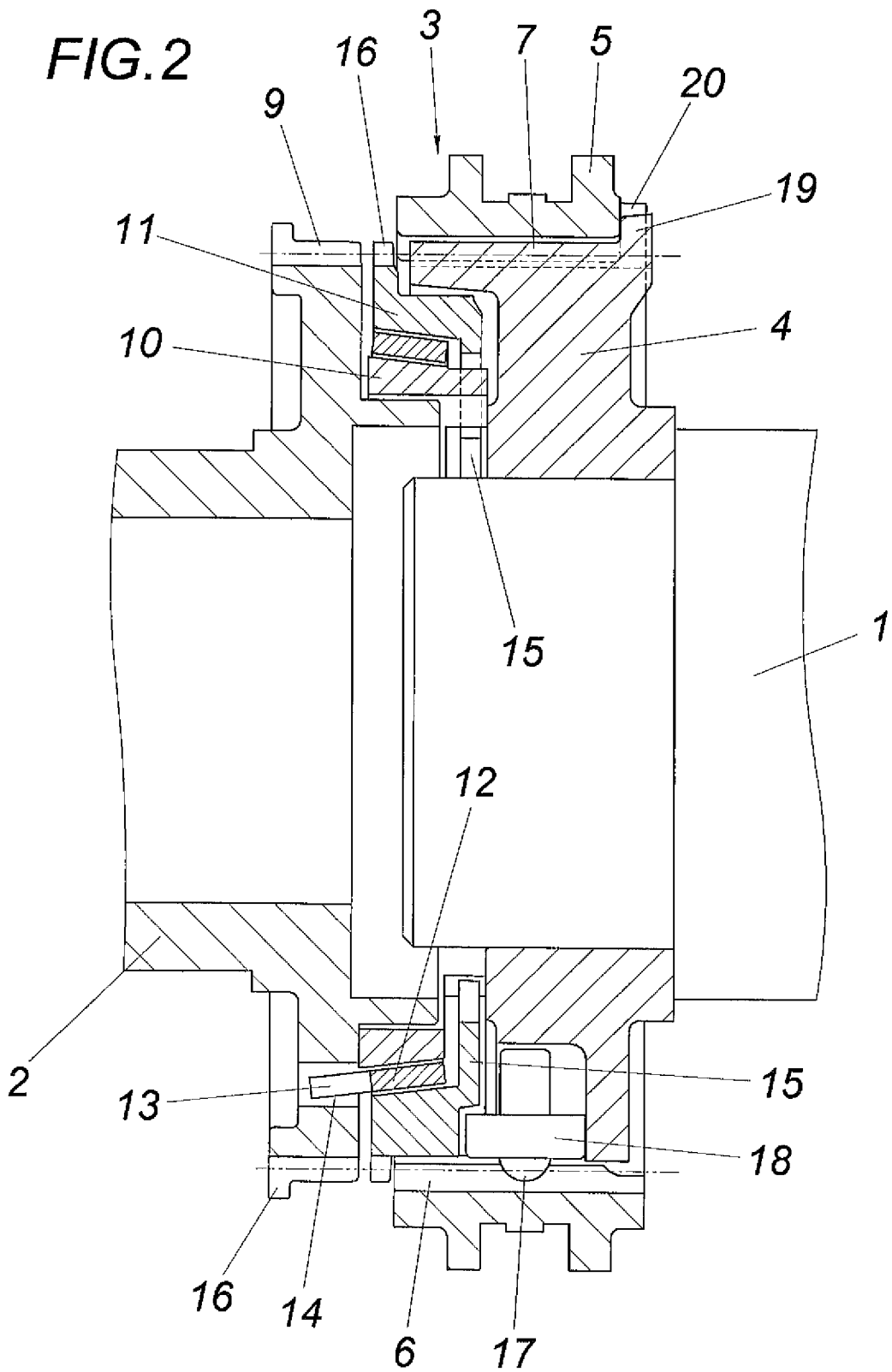

SYNCHRONISING DEVICE BETWEEN TWO REVOLVING COMPONENTS

CROSS REFERENCE TO RELATED APPLICATIONS

This application is the National Stage of PCT/AT2012/050189 filed on Dec. 5, 2012, which claims priority under 35 U.S.C. §119 of Austrian Application No. A 50003/2011 filed on Dec. 9, 2011, the disclosure of which is incorporated by reference. The international application under PCT article 21(2) was not published in English.

FIELD OF THE INVENTION

The invention relates to a synchronising device between two revolving components, comprising a clutch between a hub arranged on a shaft in a rotationally fixed manner and a coupling member that is rotatably mounted in relation to the hub, the clutch having a selector sleeve with an internal claw gear which extends along the axial length of the selector sleeve and by means of which claw gear the selector sleeve is mounted in an axially displaceable manner on a claw rim of the hub and can be slid up onto a claw rim of the coupling member for coupling purposes.

DESCRIPTION OF THE PRIOR ART

In variable-ratio gear transmissions with a hub situated on a shaft in a rotationally fixed manner and a gear wheel which is mounted in a freely rotatable manner on the shaft, it is common practice to provide a synchronising device with a cone clutch between the hub and the gear wheel, which comprises a double-cone ring producing rotational entrainment of the gear wheel, which double-cone ring is clamped in a force-locked manner between an internal friction ring and a synchronised disc which is axially adjustable by the selector sleeve in relation to said friction ring and is associated with the hub. If the selector sleeve is displaced on the hub within the terms of a coupling engagement, the double-cone ring is accelerated in a frictionally engaged manner between the internal friction ring and the outer synchronised disc, and therefore the gear wheel connected in a rotationally fixed manner to the double-coned ring, to the circumferential speed of the hub by the axial entrainment of the synchronised disc via spring-loaded thrust elements, which enables the subsequent unobstructed coupling engagement between the selector sleeve and the claw rim of the gear wheel. A lock toothing, which is arranged on the synchronised disc and cooperates with the claws of the selector sleeve, prevents that the selector sleeve can carry out the axial coupling movement during the synchronising.

Similarly, known synchronising devices for clutches between two shafts operate in the similar way, of which the one carries the hub of the selector sleeve and the other the coupling member.

Irrespective of whether the synchronising device is used for a variable-ratio gear transmission or a shiftable shaft coupling, the axial displacement position of the selector sleeve is determined by a shift fork acting on the selector sleeve, which requires a constructional determination of the shift fork position in the disengagement position of the clutch between the hub and the coupling member. It is known for this purpose (KR 100887848 B1) to arrange the selector sleeve with projections protruding beyond the internal claw ring, which engage beyond the radially protruding stops of the claw rim on the hub side. These stops cooperate with the face end of the claw gear of the selector sleeve, so that the stops protrude beyond the minimum length of the selector sleeve which is determined by the claw gear of the selector sleeve, which leads to an increase in the overall length.

SUMMARY OF THE INVENTION

The invention is therefore based on the object of providing a synchronising device of the kind mentioned above in such a way that an extension can ensure a reduced overall length for the synchronising device for fixing the shift fork position for the disengagement position of the clutch with simple constructional measures.

This object is achieved by the invention in such a way that the hub forms at least one stop for the selector sleeve on the face side facing away from the coupling member, the stop protruding radially over the claw rim and the selector sleeve receiving the stop in a frontal stop recess.

Since the selector sleeve must be displaced in only one direction to the coupling position from a predetermined initial position in the case of synchronising devices between two rotating components, either between a hub and a gear wheel or between two shafts, this initial position can be determined constructionally by an axial stop for the selector sleeve which belongs to the hub and which therefore also predetermines the position of the shift fork for this selector sleeve position without increasing the axial overall length of the synchronising device. The claw rim of the hub which protrudes radially to the outside beyond the claw rim of the hub engages in the stop position of the sliding sleeve into the frontal stop recess provided in the sliding sleeve, so that neither the stop nor the hub needs to protrude axially beyond the front face of the sliding sleeve in the stop position. An additional factor is that a stop applied radially to the hub and protruding beyond the claw rim can be produced in a simple way by means of powder metallurgy without any particular additional effort concerning the tools, which also applies to the stop recess in the selector sleeve, so that subsequent machining of these constructional parts for sintered hubs and selector sleeves for producing the stop or a stop recess can be avoided.

In order to ensure that no torque loading around a transverse axis can occur on the selector sleeve by the stop of the hub, it is recommended to provide three stops which are evenly distributed over the circumference of the hub. Since usually three spring-loaded thrust elements which are displaceable by the selector sleeve are provided for axial pressurising of the synchronised disc of a cone clutch in the hub which is provided with a lock toothing, the stops can advantageously be distributed over the circumference between these thrust elements.

BRIEF DESCRIPTION OF THE DRAWINGS

The subject matter of the invention is shown by way of example in the drawings, wherein:

FIG. 2 shows a sectional view along the line II-II of FIG. 1 on an enlarged scale.

DESCRIPTION OF THE PREFERRED EMBODIMENT

Figure 1:
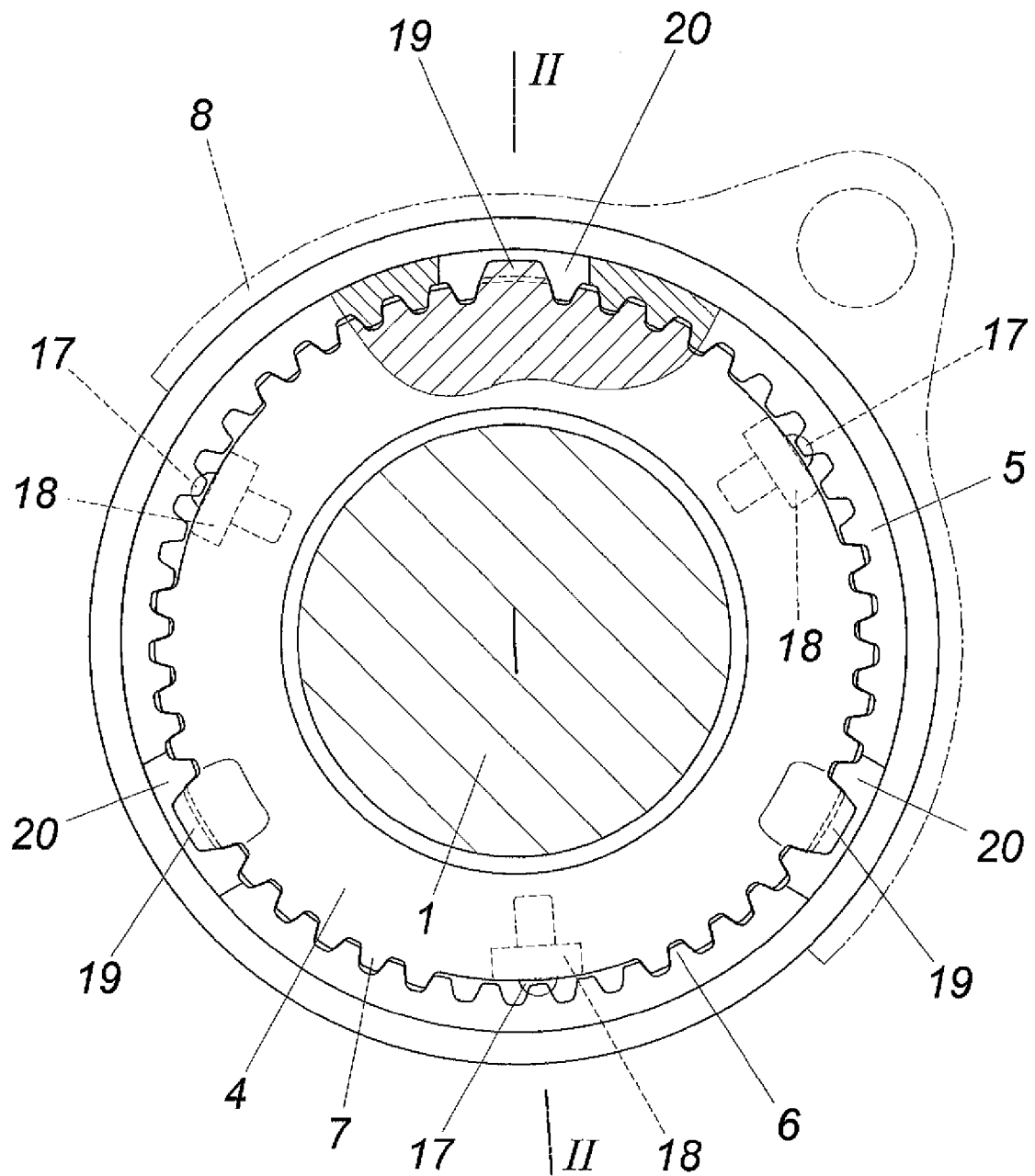
FIG. 1 shows a synchronising device for a shiftable shaft coupling in a schematic, partly elevated view of the front face facing away from the coupling member.

The illustrated synchronising device is provided on a shaft 1, which is mounted in a freely rotatable manner in relation to the coupling member 2. Said coupling member 2 can be rotatably mounted on the driven shaft 1 in a variable-ratio gear transmission and be connected in a rotationally fixed manner to a gear wheel. In the illustrated embodiment, the coupling member 2 represents a further shaft which can be selectively drive-connected by means of a clutch 3 to a hub 4 situated in a rotationally fixed manner on the shaft 1. The clutch 3 comprises a selector sleeve 5, which is mounted in an axially displaceable manner via an internal claw gear 6 on a claw rim 7 of the hub 4 and can be pushed by means of a shift fork 8 onto a claw rim 9 of the coupling member 2, which shift fork is indicated by a dot-dash line in FIG. 1.

In order to enable actuating the clutch 3 only when the speed of the hub 4 corresponds to the speed of the coupling member 2 to be coupled, a synchronising device is provided which comprises an internal friction ring 10, an outer synchronised disc 11 and a double-cone ring 12. The arrangement of the cone clutch with a double-cone ring is not mandatory however. Whereas the friction ring and synchronised disc 10, 11 are associated with the hub 4, the double-cone ring 12 is connected in a rotationally fixed manner to the coupling member 2 via drivers 13 which engage in respective receivers 14 of the coupling member 2. The synchronised disc 11, which forms a cone clutch with the friction ring 10 and the double-cone ring 12, is mounted in an axially displaceable manner on the hub 4 in relation to the friction ring 10 and is coupled to the friction ring 10 via drivers 15 for rotary entrainment.

In order to ensure that the selector sleeve 5 can be brought into engagement with the claw rim 9 of the coupling member 2 only after a synchronisation of the rotational speeds of the hub 4 and the coupling member, the synchronised disc 11 which can be twisted in relation to the selector sleeve 5 within limits is provided with a lock toothing 16 which cooperates with the claw gear 6 of the selector sleeve 5. When the selector sleeve 5 is displaced against the coupling member 2 from its illustrated middle position, thrust elements 18 which are distributed over the circumference of the hub 4 and which are coupled via a spring notch 17 to the selector sleeve 5 are axially pressed against the synchronised disc 11, so that a frictionally engaged connection is produced between the synchronised disc 11 and the friction ring 10 on the one hand and the double-cone ring 12 on the other hand, with the effect that differences in the rotational speed between the synchronised disc 11 and the coupling member 2 are compensated. Since the front faces of the claw gear 6 of the selector sleeve 5 are pressed against the lock toothing 16 during this synchronisation, the engagement of the claw gear 6 of the selector sleeve 5 through to the claw rim 9 of the coupling member 2 is locked. Only after the reduction in the frictional torque produced by synchronisation is it possible to utilise the torque for mutual twisting of the synchronised disc 11 and the selector sleeve 5, which torque is caused by the roof inclinations of the front faces of the claw gear 6 and the lock toothing 16 resting on each other in cooperation with the axial actuating force of the selector sleeve 5, this being in order to introduce the claw gear 6 of the selector sleeve 5 past the lock toothing 16 of the synchronised disc 11 into the claw rim 9 of the coupling member 2, thereby completing the coupling process.

As is shown in particular in FIG. 2, the hub 4 comprises at least one stop 19 for the selector sleeve 5 on the front face opposite of the coupling member 2, which stop 19 protrudes radially beyond the claw rim 7. The selector sleeve 5 is provided for this purpose with stop recesses 20 on the front side, into which the stop 19 engages in the stop position of the selector sleeve 5. The stop position of the selector sleeve 5 as shown in FIG. 2 corresponds to the disengagement position of the clutch 3. As a result of the engagement of the stop 19 of the hub 4 in the stop recess 20 of the selector sleeve 5, nothing changes with respect to the axial overall length of the synchronising device in comparison with conventional synchronising devices without stop 19. As a result of the axial stop position of the selector sleeve 5 in the disengagement position of the clutch, the axial displacement position of the shift fork 8 is constructionally predetermined for this disengagement position, without requiring additional measures for this purpose.

In accordance with the embodiment according to FIG. 1, three stops 19 are evenly distributed about the circumference of the hub 4. The arrangement is made in such a way that the stops 19 come to lie between the three thrust elements 18 for axially pressurising the synchronised disc 11, so that rotationally symmetrical support conditions are produced for the selector sleeve 5 without impairing the function of the locking synchronisation.

The stops 19 can advantageously be co-moulded during the production of the hub 4 by means of powder metallurgy, which allows especially simple production conditions without having to subsequently machine the hub 4 concerning the stops 19. Similarly, the stop recesses 20 of the selector sleeve 20 can be considered when producing the selector sleeve 5 by means of powder metallurgy.

The invention claimed is:

1. A synchronizing device between two revolving components, comprising a clutch (3) between a hub (4) arranged on a shaft (1) in a rotationally fixed manner and a coupling member (2) that is rotatably mounted in relation to the hub (4), the clutch (3) having a selector sleeve (5) with an internal claw gear (6) which extends along and over the axial length of the selector sleeve (5) and by means of which claw gear the selector sleeve (5) is mounted in an axially displaceable manner on a claw rim (9) of the hub (4) and can be slid up onto a claw rim (9) of the coupling member (2) for coupling purposes, wherein the hub (4) forms at least one stop (19) for the selector sleeve (5) on the front side facing away from the coupling member (2), the stop (19) protruding radially over the claw rim (7) and the selector sleeve (5) receiving the stop (19) in a frontal stop recess (20).

2. The synchronizing device according to claim 1, wherein three stops (19) are provided which are evenly distributed over the circumference of the hub (4).

\* \* \* \* \*